United States Patent
Ito

(10) Patent No.: US 9,645,783 B2
(45) Date of Patent: May 9, 2017

(54) DISPLAY CONTROL APPARATUS AND DISPLAY CONTROL METHOD

(71) Applicant: CANON KABUSHIKI KAISHA, Tokyo (JP)

(72) Inventor: Motohisa Ito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/940,476

(22) Filed: Nov. 13, 2015

(65) Prior Publication Data

US 2016/0139869 A1    May 19, 2016

(30) Foreign Application Priority Data

Nov. 14, 2014   (JP) .................................. 2014-231973

(51) Int. Cl.
| | |
|---|---|
| *G06F 3/14* | (2006.01) |
| *H04N 9/31* | (2006.01) |
| *G06F 3/01* | (2006.01) |
| *G09G 3/00* | (2006.01) |

(52) U.S. Cl.
CPC ............ *G06F 3/1446* (2013.01); *G06F 3/017* (2013.01); *G09G 3/001* (2013.01); *H04N 9/3147* (2013.01); *G09G 2300/026* (2013.01); *G09G 2320/0693* (2013.01); *G09G 2356/00* (2013.01); *G09G 2370/02* (2013.01)

(58) Field of Classification Search
CPC .......... G06F 3/01; G06F 3/017; G06F 3/0346; G06F 3/041; G06F 3/0416; G06F 3/048
See application file for complete search history.

(56) References Cited

U.S. PATENT DOCUMENTS

| | | | | |
|---|---|---|---|---|
| 5,924,013 A | * | 7/1999 | Guido ................ | H04N 21/6581 348/E5.108 |
| 2004/0222983 A1 | * | 11/2004 | Kakemura ............ | G06F 3/1431 345/204 |
| 2009/0096939 A1 | * | 4/2009 | Nomizo ............... | H04N 9/3147 348/744 |

FOREIGN PATENT DOCUMENTS

JP       2012-019442 A     1/2012

* cited by examiner

*Primary Examiner* — Olga Merkoulova
(74) *Attorney, Agent, or Firm* — Carter, DeLuca, Farrerll & Schmidt, LLP

(57) ABSTRACT

This invention provides a technique capable of efficiently setting a projector. A display instruction to display the setting window of at least one of a plurality of projectors is accepted. If a predetermined area on a multi-projection area in which the setting window of the projector is displayed crosses display areas of a plurality of second projectors of the plurality of projectors, each of the plurality of second projectors displays a partial image of the setting window in response to acceptance of the display instruction.

12 Claims, 10 Drawing Sheets

F I G. 5A
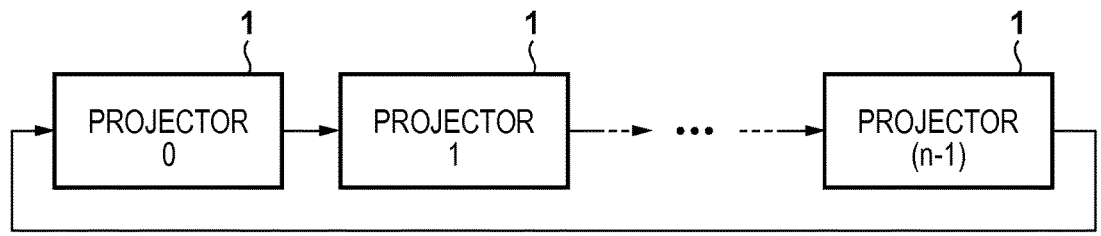
F I G. 5B
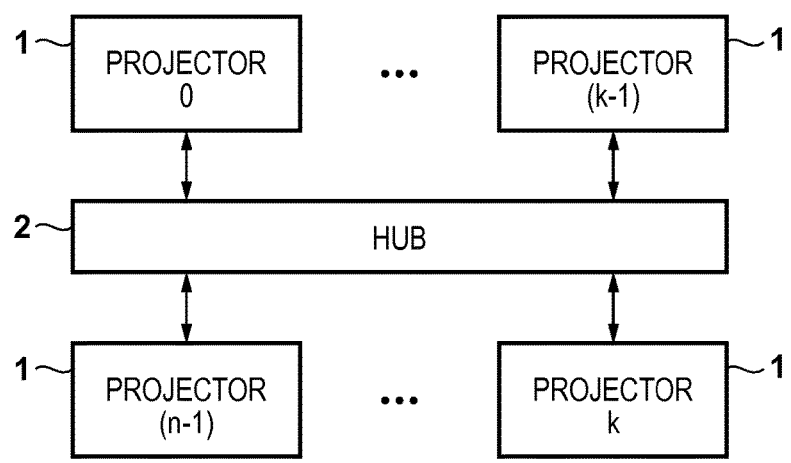

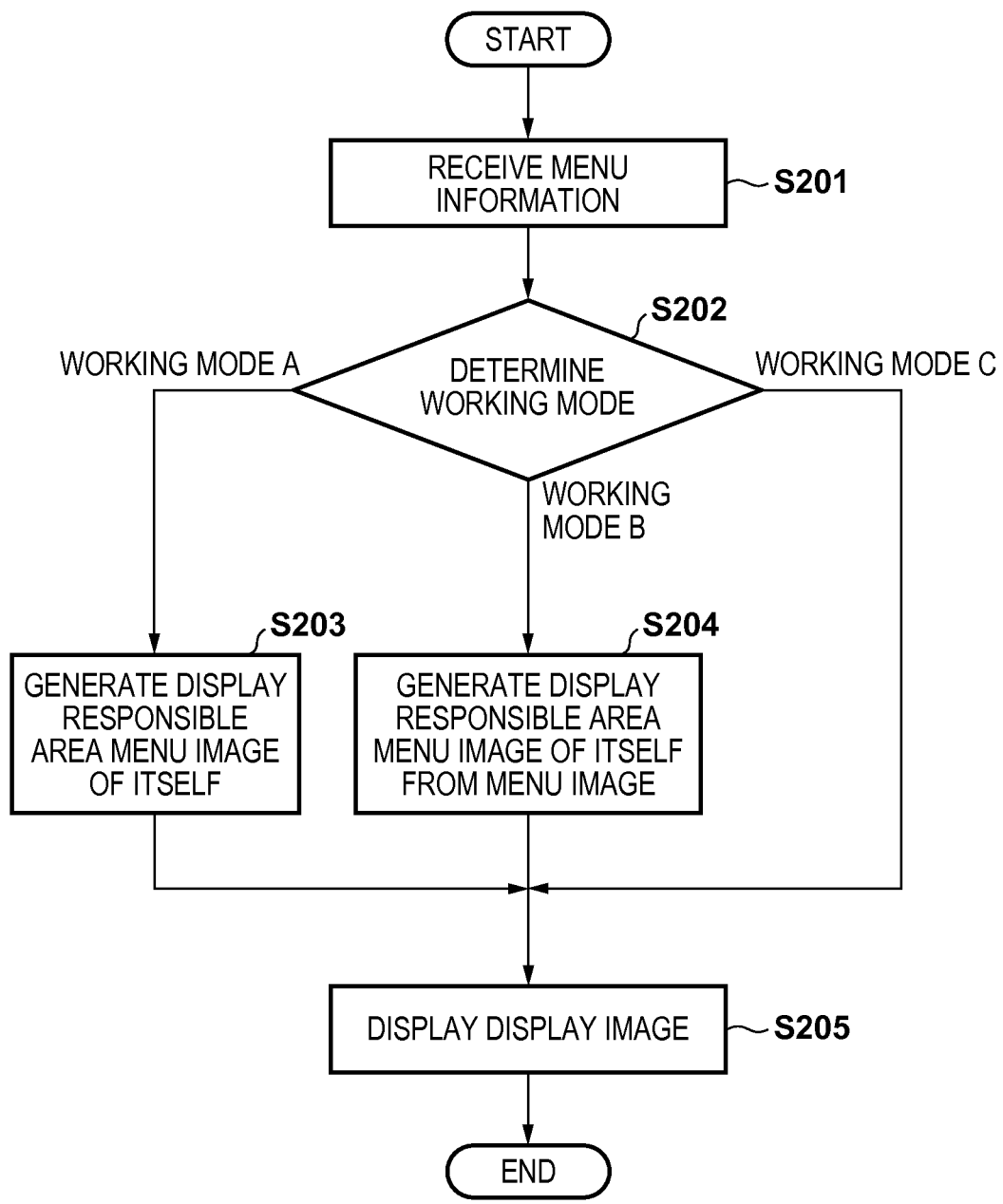

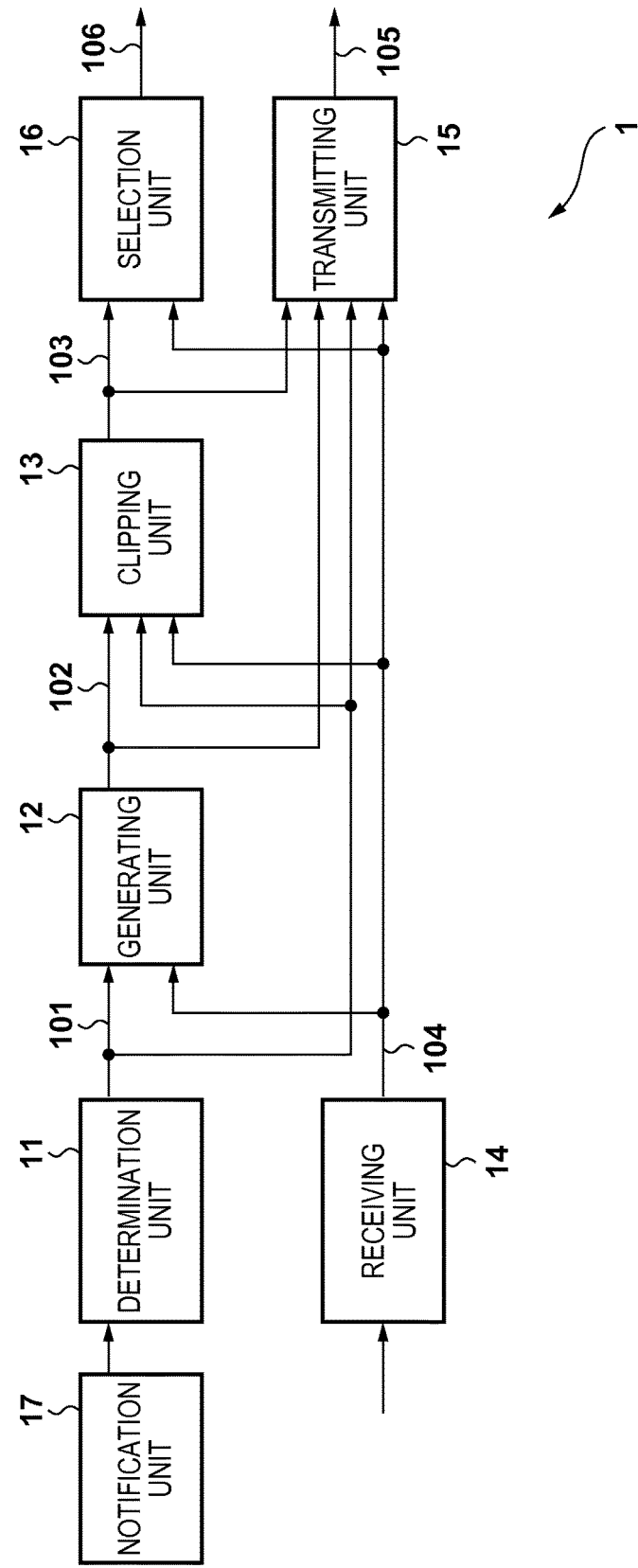

DISPLAY CONTROL APPARATUS AND DISPLAY CONTROL METHOD

BACKGROUND OF THE INVENTION

Field of the Invention

The present invention relates to a display control apparatus and display control method for displaying the setting screen of a projector.

Description of the Related Art

In the entertainment field, the industrial field, and the like, display devices for displaying large-screen video or nonplanar video have become widespread. For example, in the entertainment field, there exist game machines that improve the reality by displaying video to surround an operator. In the industrial field, there are use cases for flight simulators. A large-screen display surface or nonplanar display surface is often formed by a multi-projection system for displaying video by combining a plurality of projectors. This is because it is possible to combine a plurality of projectors thereby readily forming a large screen, or displaying video even if a screen is nonplanar.

In the aforementioned multi-projection system, there is known a method of displaying a menu (setting screen) for setting a projector in a projection area. Japanese Patent Laid-Open No. 2012-19442 describes a technique in which among a plurality of projectors, a projector holding an OSD token projects a menu screen and another projector holding no OSD token projects a black image onto a projection area of the menu screen.

However, when the setting screen of a projector is displayed on the multi-projection area, setting of the projector may be troublesome depending on the display position of the setting screen of the projector. For example, there may be case in which the user who has performed an operation of displaying the setting screen of the projector is away from the setting screen which has been displayed on the multi-projection area in response to the operation. In this case, it may be necessary for the user to move to the display position of the setting screen.

SUMMARY OF THE INVENTION

The present invention has been made to solve the above-described problem, and provides a technique capable of efficiently setting a projector.

According to an aspect of the present invention, there is provided a display control apparatus for displaying a setting window for a plurality of projectors on a multi-projection area that is formed by combining display areas of the plurality of projectors and is larger than each of the display areas, comprising an acceptance unit that accepts a display instruction to display the setting window of at least one of the plurality of projectors; and a display control unit that causes, in a case where a predetermined area on the multi-projection area in which the setting window of the projector is displayed crosses display areas of a plurality of second projectors of the plurality of projectors, each of the plurality of second projectors to display a partial image of the setting window in response to acceptance of the display instruction.

Further features of the present invention will become apparent from the following description of exemplary embodiments (with reference to the attached drawings).

BRIEF DESCRIPTION OF THE DRAWINGS

FIGS. 5A and 5B are block diagrams each showing the network arrangement of projectors;

FIG. 7 is a flowchart illustrating the operation of a slave projector;

FIG. 8 is a block diagram showing the arrangement of a display control apparatus;

DESCRIPTION OF THE EMBODIMENTS

Figure 1A:
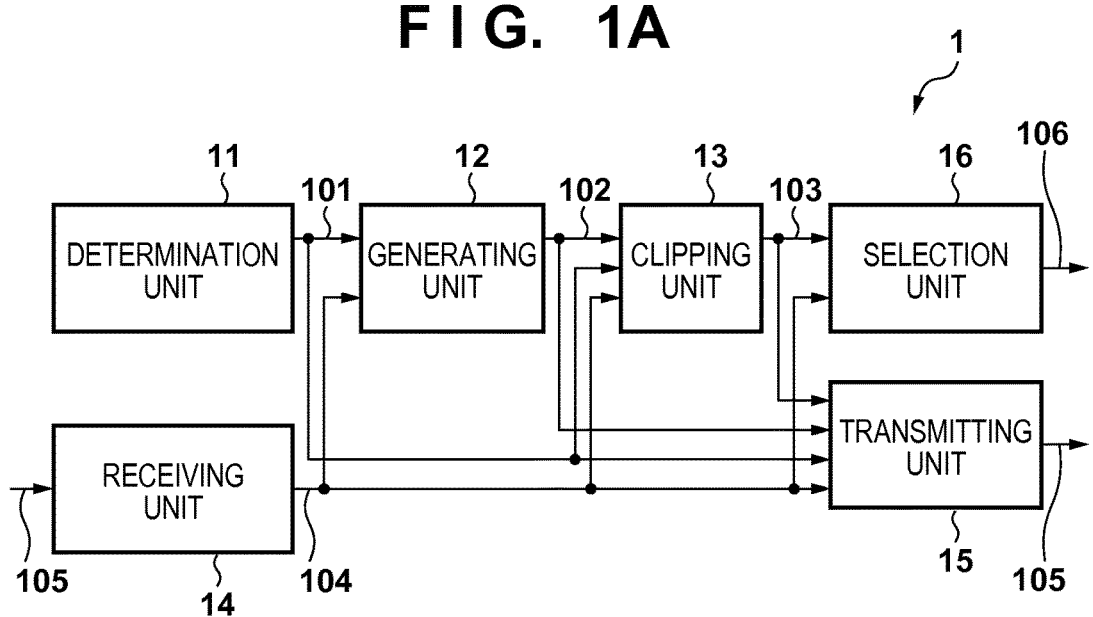
FIGS. 1A and 1B are block diagrams each showing the arrangement of a display control apparatus.

Embodiments of the present invention will be described below with reference to the accompanying drawings. Note that the embodiments and details can be changed without departing from the spirit and scope of the present invention. Therefore, the embodiments are not limited to the contents described below. The embodiments to be described below may be implemented on hardware or by software executed on a computer, unless otherwise specified. In principle, the same reference numerals denote components having the same functions, and a repetitive description thereof will be omitted.

The following embodiments will exemplify a projector implemented as a display control apparatus. Prior to a description of the embodiments, a coordinate system to be used in a projector according to the embodiments will be explained. In the embodiments, in a multi-projection system that forms one display area by combining the display areas of a plurality of projectors, a left-handed coordinate system having the upper left pixel of the display area as an origin (0, 0) is used. The unit of a coordinate value is "pixel". Note that in the multi-projection system according to the embodiments, an example in which one display area is formed by making the display areas of the plurality of projectors partially overlap each other will be mainly described. A multi-projection area displayed by multi-projection is larger than the display area of each projector.

Only when there is no possibility of confusion, it is assumed that the user indicates a person who performs a setting operation for a projector using a menu serving as an interface for performing a setting operation for the projector.

Furthermore, in the multi-projection system using projectors, a projector for which setting is to be performed using a menu operated by the user will be referred to as a master projector (first display device) hereinafter. On the other hand, a projector other than the master projector will be referred to as a slave projector (second display device) hereinafter. That is, there are one master projector and one or more slave projectors.

First Embodiment

The arrangement of a display control apparatus 1 that implements each of a plurality of projectors forming a multi-projection system will be described with reference to FIG. 1A. FIG. 1A is a block diagram showing the functional components of the display control apparatus 1. The display control apparatus 1 includes at least a determination unit 11, a generating unit 12, a clipping unit 13, a receiving unit 14, a transmitting unit 15, and a selection unit 16.

The determination unit 11 determines specifications necessary to generate a menu window (setting screen) serving as an interface for performing a setting operation for a projector. Specifications necessary to generate a menu window will be referred to as menu specifications 101 hereinafter. Note that in this embodiment, the specifications indicate pieces of information representing the display coordinates, size, color, and contents of the menu window. However, not all of the pieces of information need to be included in the specifications. Other information may be included in the specifications. The generating unit 12 generates a menu image 102 as a display entity of the menu window based on the menu specifications 101 (parameter information of the menu). The clipping unit 13 clips, from the menu image 102, an area (display responsible area) for which a projector is in charge of display, and generates a display responsible area menu image 103. The menu window in this embodiment is a menu for setting at least one of the plurality of projectors for performing multi-projection.

The receiving unit 14 receives, as received menu information 104, menu information 105' transmitted by another projector. The transmitting unit 15 transmits the menu specifications 101, menu image 102, display responsible area menu image 103, or received menu information 104 to another projector as menu information 105. The selection unit 16 selects the display responsible area menu image 103 clipped by the clipping unit 13 or the received menu information 104 based on the working mode of the projector, and outputs it as a display image 106 of the menu.

Figure 1B:
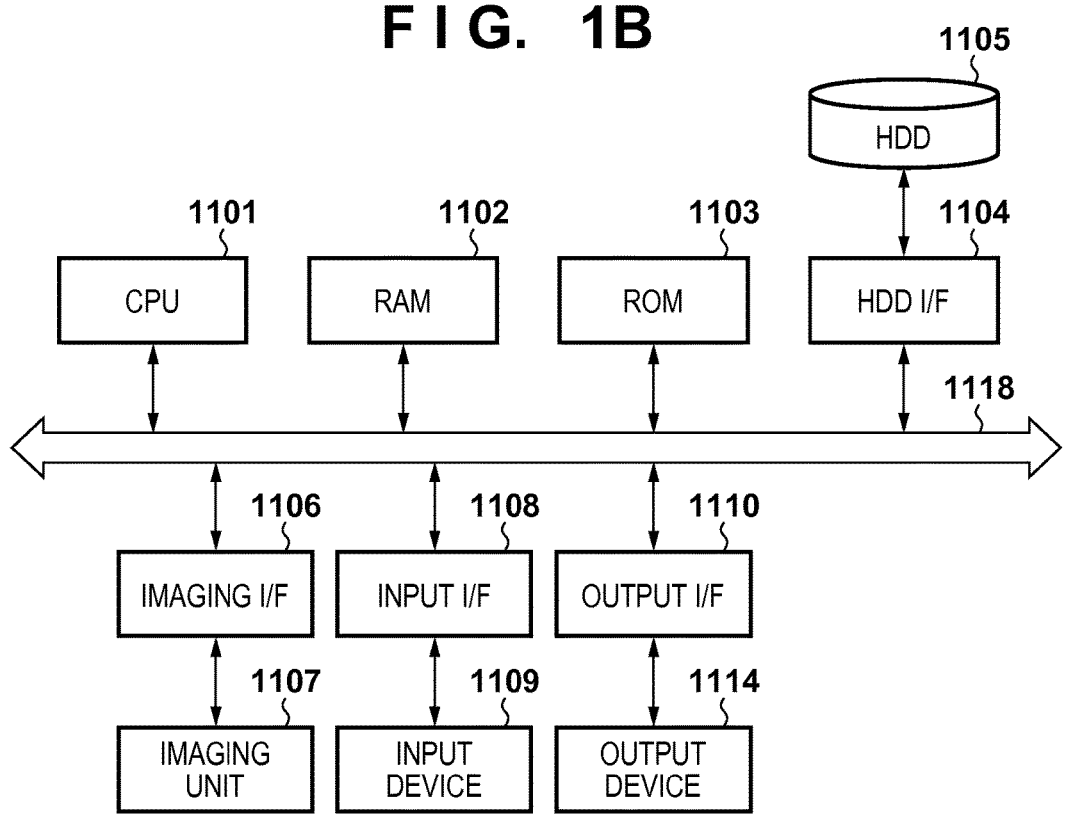

FIG. 1B shows the hardware arrangement of the display control apparatus 1. Referring to FIG. 1B, a CPU 1101 implements the various functional components shown in FIG. 1A by reading out programs stored in a ROM 1103 or a hard disk drive (HDD) 1105, storing them in a RAM 1102 functioning as a work memory, and executing them. The CPU 1101 controls various components interconnected via a system bus 1118.

An HDD interface (I/F) 1104 connects the HDD 1105 and a secondary storage device such as an optical disk drive or various memory cards. The HDD I/F 1104 is implemented by, for example, an interface such as a serial ATA (SATA) interface. The CPU 1101 can read out data from the HDD 1105 and write data in the HDD 1105 via the HDD I/F 1104. Furthermore, the CPU 1101 can expand data stored in the HDD 1105 into the RAM 1102, and save, in the HDD 1105, the data expanded into the RAM 1102. The CPU 1101 can execute the data expanded into the RAM 1102 as a program.

An imaging interface (I/F) 1106 connects an image input device such as an imaging unit 1107. The imaging I/F 1106 is implemented by, for example, a serial bus interface such as a USB or IEEE1394 interface. The CPU 1101 can control the imaging unit 1107 via the imaging I/F 1106, and perform imaging. Furthermore, the CPU 1101 can load captured image data from the imaging unit 1107 via the imaging I/F 1106.

An input interface (I/F) 1108 connects an input device 1109 such as a remote controller, buttons, or a dial. The input I/F 1108 may be implemented by, for example, a serial bus interface such as a USB or IEEE1394 interface, or a wireless interface such as infrared communication, WiFi, or Bluetooth. The CPU 1101 can load data from the input device 1109 via the input I/F 1108. An output interface (I/F) 1110 connects an output device 1114 such as a liquid crystal display device. The output I/F 1110 is, for example, a video output interface such as SDI, DVI, or HDMI®. The CPU 1101 can transmit video data to the output device 1114 via the output I/F 1110 to output (display) an image to a projection plane such as a screen.

Before explaining the various functional components of the projector shown in FIG. 1A in detail, the working mode of the projector will be described. This embodiment assumes that the projector has three working modes A to C below. The working mode of the projector is not limited to the following ones, as a matter of course.

Working mode A: Each of the master projector and the slave projector generates the menu image 102.

Working mode B: Only the master projector generates the menu image 102, and the slave projector generates the display responsible area menu image 103.

Working mode C: Only the master projector generates the menu image 102 and the display responsible area menu image 103.

In working mode A, each of the master projector and the slave projector generates the menu image 102. The master projector generates the menu image 102 based on the menu specifications 101 determined by the determination unit 11. On the other hand, each slave projector receives the menu specifications 101 transmitted by the master projector using the transmitting unit 15, and generates the menu image 102 based on the received menu specifications 101.

In working mode B, only the master projector generates the menu image 102 based on the menu specifications 101 determined by the determination unit 11. The master projector transmits the generated menu image 102 to each slave projector using the transmitting unit 15. On the other hand, each slave projector receives the menu image 102 transmitted by the master projector, clips an area corresponding to a projection area from the received menu image 102, and generates the display responsible area menu image 103 of itself.

In working mode C, only the master projector generates the menu image 102 based on the menu specifications 101 determined by the determination unit 11. In addition, the master projector generates the display responsible area menu image 103 to be displayed by each slave projector. The master projector transmits the generated display responsible area menu image 103 to the corresponding slave projector using the transmitting unit 15. Each slave projector generates the display image 106 of the menu based on the received display responsible area menu image 103.

Note that the working mode can be designated by, for example, the input device 1109 of the master projector among the plurality of projectors forming the multi-projection system. That is, the input device 1109 is used to designate the working mode. Then, working mode information indicating the designated working mode is stored in the RAM 1102.

Figure 2A:
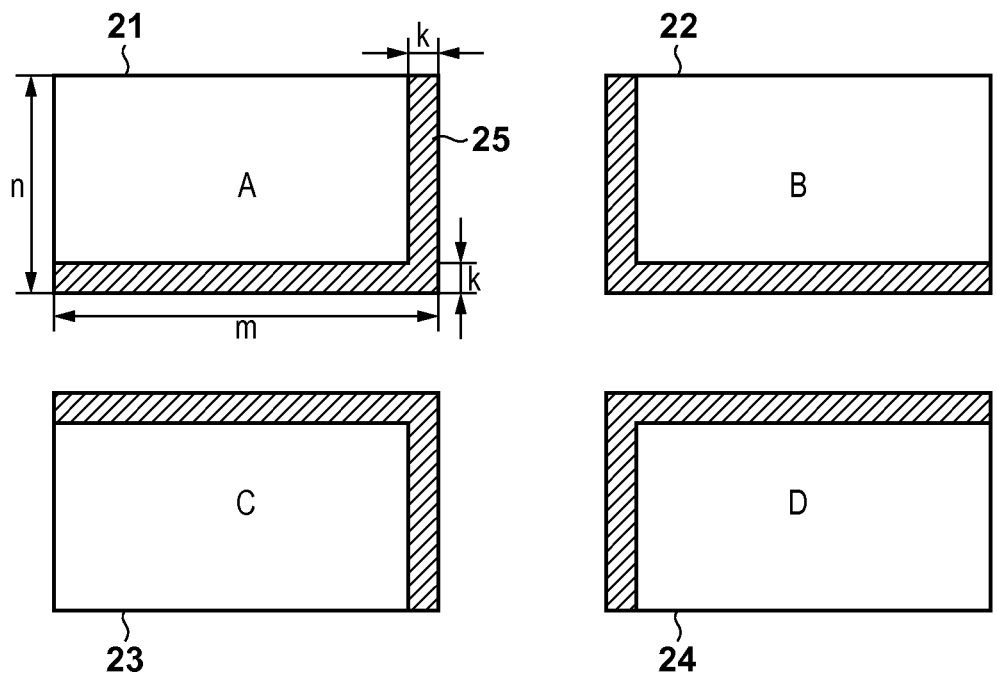
FIGS. 2A and 2B are views for explaining a multi-projection system.
Figure 2B:
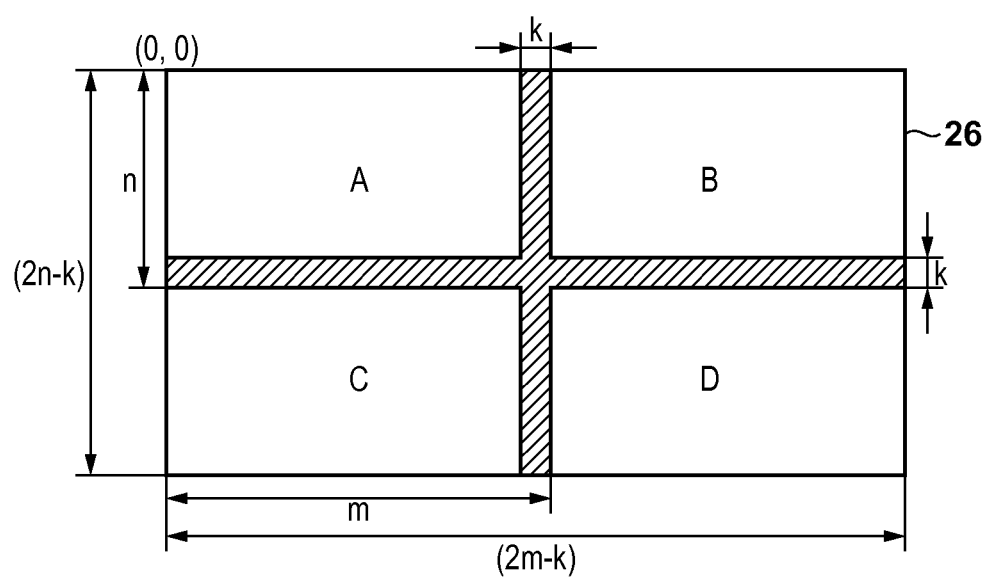

The multi-projection system according to this embodiment will be described with reference to FIGS. 2A and 2B. FIGS. 2A and 2B show an example of a multi-projection system constructed using four projectors. The four projectors have display surfaces with the same shape and the same size of width m×height n. When it is necessary to discriminate the four projectors, the projectors will be respectively referred to as projector A, projector B, projector C, and projector D hereinafter.

FIG. 2A is a view showing the relationships between an overlapping area 25 and the display surfaces of the four projectors. The multi-projection system shown in FIG. 2A performs multi-projection by combining the four projectors. Assume that the overlapping area has a width k in the horizontal and vertical directions of the display surface. With respect to the entire display area by the multi-projection system, a display surface 21 of projector A is in charge of the upper left area. Therefore, the display surface 21 of projector A includes the overlapping area of the width k at the right and lower ends. Similarly, a display surface 22 of projector B is in charge of the upper right area, and h includes as the overlapping area at the left and lower ends. A display surface 23 of projector C is in charge of the lower left area, and includes the overlapping area at the right and upper ends. A display surface 24 of projector D is in charge of the lower right area, and includes the overlapping area at the left and upper ends.

FIG. 2B shows an example of the display area forming the multi-projection system by combining the four display surfaces shown in FIG. 2A. A large display area 26 of the multi-projection system has a size of a width $2m\text{-}k$ and a height $2n\text{-}k$.

Figure 3:
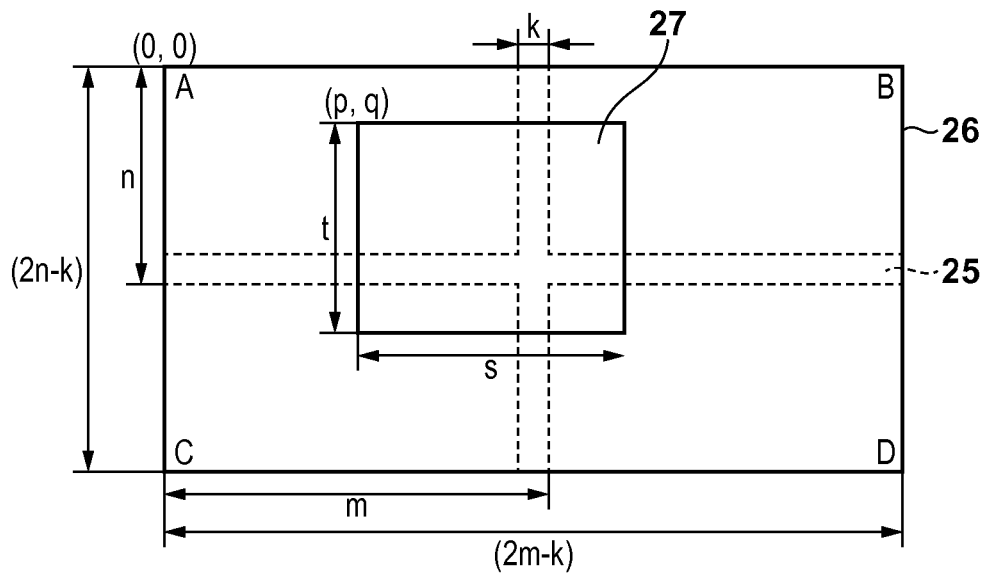
FIG. 3 is a view showing an example of menu display on the multi-projection system.

The determination unit 11 will be described. The menu specifications 101 (parameter information) determined by the determination unit 11 include at least the display position of a menu window 27 in the large display area 26 and the size of the menu window 27, as shown in FIG. 3. In addition, the menu specifications 101 may include the display contents of the menu window 27, and the operation definition upon selection of a menu item. The contents of the menu specifications 101 are not limited to the above items, as a matter of course. Furthermore, for example, if the default display position of the menu window has already been determined to be at the center on the multi-projection area, the display position information is not essential. Similarly, with respect to the size of the menu window, if the default size has been set, the size information is not essential.

The display position and size of the menu window 27 included in the menu specifications 101 will be described in detail with reference to FIG. 3. FIG. 3 is a view showing examples of the large display area 26 and menu window 27 of the multi-projection system. Unless misunderstanding is caused, the large display area 26 of the multi-projection system constructed using the projectors will be referred to as the display surface 26 hereinafter. In this embodiment, the display position and size of the menu window 27 are described using the left-handed coordinate system having the upper left pixel of the display surface 26 as an origin (0, 0). The display position of the menu window 27 is represented by the coordinates of the upper left pixel of the menu window 27, and the size of the menu window 27 is represented by a combination of a width in the horizontal direction and a height in the vertical direction of the menu.

Referring to FIG. 3, since the coordinates of the upper left pixel of the menu window 27 are (p, q), the display position of the menu window 27 is represented by (p, q). In addition, since the menu window 27 has a width of s pixels and a height of t pixels, the size of the menu window 27 is represented by (s, t).

The user can set the display position and size of the menu window 27. For example, by the following method, the user sets, in the determination unit 11, designation information necessary to generate the menu window 27, such as the display position and size of the menu window 27.

1) Perform setting using a device separated from the projector.

2) Perform setting using the input device (buttons, a lever, or the like) of the projector main body.

In either case, it is possible to designate the position of the menu window 27. A position and size optimum for an operator (user) may be estimated based on the position and distance of the operator with respect to the large display area 26 of the multi-projection system, and the estimated display position and size of the menu window 27 may be set in the determination unit 11. For example, an infrared motion sensor is connected to the determination unit 11, and the position and distance of the operator with respect to the large display area 26 of the multi-projection system are measured based on human body detection information detected by the motion sensor. Based on the viewing angle of a human and the position relationship between the detected position of the user and the large display area 26 of the multi-projection system, the display position and size of the menu window 27 are calculated. Measurement of the position and distance of the operator with respect to the large display area 26 of the multi-projection system is not limited to the infrared motion sensor, and can be performed by a known technique capable of measuring the position and distance of the operator.

A method of setting the display position and size of the menu window 27 in the determination unit 11 is not limited to the above-described one, as a matter of course.

The operation of the generating unit 12 will be described in detail. The generating unit 12 generates the menu image 102 as a display entity of the menu window 27 based on the menu specifications 101. The operation of the generating unit 12 depends on whether the projector serves as a master projector or a slave projector. If the projector serves as a slave projector, its operation depends on the working mode. Table 1 shows the operation of the generating unit 12 according to this embodiment.

TABLE 1

| | type of projector | working mode of projector | operation of second function unit |
|---|---|---|---|
| 1 | master projector | working mode A, B, or C | generate menu image based on menu specifications generated by first function unit |
| 2 | slave projector | working mode A | generate menu image based on menu specifications received by receiving unit |
| 3 | | working mode B | perform no operation |
| 4 | | working mode C | |

As shown in Table 1, if the projector serves as a master projector, the generating unit 12 generates the menu image 102 based on the menu specifications 101 determined by the determination unit 11 regardless of the working mode.

On the other hand, if the projector serves as a slave projector, the operation of the generating unit 12 depends on the working mode. As shown in Table 1, if the projector serves as a slave projector and is in working mode A, the generating unit 12 generates the menu image 102 based on the menu specifications 101 received by the receiving unit 14. If the projector serves as a slave projector and is in working mode B or C, the generating unit 12 performs no operation and generates no menu image 102.

Note that the method of generating the menu image 102 need not depend on the method shown in Table 1, and it is possible to generate the menu image 102 by a known technique. For example, the menu image 102 may be generated using the API of a window system such as Motif.

The relationship between the menu window 27 and the display responsible area (a partial image clipped from the whole image of the menu window 27) of each projector in the multi-projection system will be explained with reference to FIGS. 3 and 4A to 4D. The display position of the menu window 27 shown in FIG. 3 is represented by (p, q) and its size is represented by (s, t).

Figure 4A:
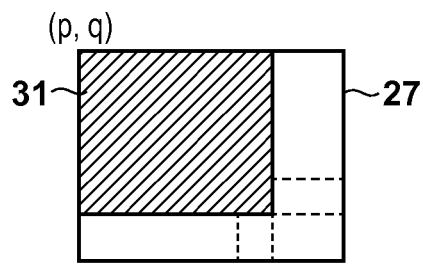
FIGS. 4A to 4D are views respectively showing the display responsible areas of projectors in the multi-projection system.
Figure 4B:
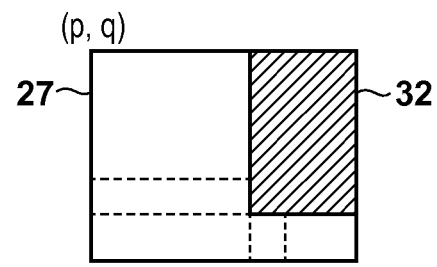
Figure 4C:
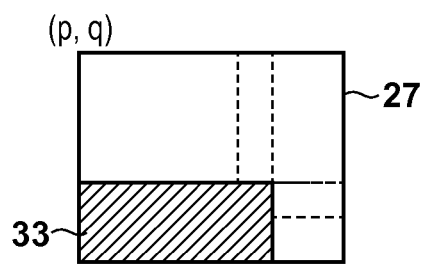
Figure 4D:
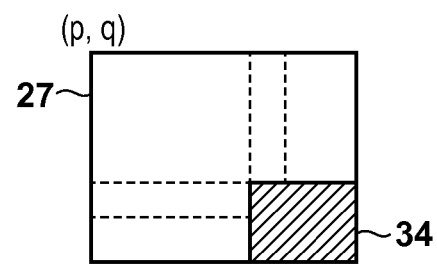

FIG. 4A shows a display responsible area 31 of projector A within the area of the menu window 27. The display responsible area 31 of projector A is a product set of the display area of projector A and the area of the menu window 27 including the overlapping area 25. Similarly, FIG. 4B shows a display responsible area 32 of projector B that is a product set of the display area of projector B and the area of the menu window 27 including the overlapping area 25. FIG. 4C shows a display responsible area 33 of projector C that is a product set of the display area of projector C and the area of the menu window 27 including the overlapping area 25. Lastly, FIG. 4D shows a display responsible area 34 of projector D that is a product set of the display area of projector D and the area of the menu window 27 including the overlapping area 25. Furthermore, Table 2 shows the display position and size of each of the display responsible areas 31 to 34 of projectors A to D.

TABLE 2

| | position of display responsible area | size of display responsible area |
|---|---|---|
| 1 | A (p, q) | (m − p, n − q) |
| | B (m − k, q) | (p + s − m + k, n − q) |
| | C (p, n − k) | (m − p, q + t − n + k) |
| | D (m − k, n − k) | (p + s − m + k, q + t − n + k) |

The operation of the clipping unit 13 will be described in detail. The clipping unit 13 clips the display responsible area of the projector from the menu image 102, and generates the display responsible area menu image 103. The operation of the clipping unit 13 depends on whether the projector serves as a master projector or a slave projector, and also changes depending on the working mode. Table 3 shows the operation of the clipping unit 13 according to this embodiment.

TABLE 3

| | type of projector | working mode of projector | operation of second function unit |
|---|---|---|---|
| 1 | master projector | working mode A or B | clip menu image of responsible area of master projector from menu image generated by second function unit based on menu specifications generated by first function unit |
| | | working mode C | clip menu image of responsible areas of all projectors from menu image generated by second function unit based on menu specifications generated by first function unit |
| 2 | slave projector | working mode A | clip menu image of responsible area of corresponding projector from menu image generated by second function unit based on menu specifications received by receiving unit |
| 3 | | working mode B | clip menu image of responsible area of corresponding projector from menu image received by receiving unit based on menu specifications received by receiving unit |
| 4 | | working mode C | perform no operation |

As shown in Table 3, in the master projector, based on the menu specifications 101 determined by the determination unit 11, the clipping unit 13 generates the display responsible area menu image 103 from the menu image 102 generated by the generating unit 12. At this time, if the current working mode is working mode A or B, the clipping unit 13 generates only the display responsible area menu image 103 of the master projector. On the other hand, if the current working mode is working mode C, the clipping unit 13 generates the display responsible area menu image 103 of each slave projector in addition to the display responsible area menu image 103 of the master projector.

A processing example when projector A serves as a master projector and projectors B to D serve as slave projectors will be explained with reference to FIGS. 4A to 4D. In working mode A or B, the clipping unit 13 of the master projector generates only the display responsible area menu image 103 of the display responsible area 31 of projector A. That is, the clipping unit 13 of the master projector generates one kind of display responsible area menu image 103. On the other hand, in working mode C, in addition to the display responsible area menu image 103, the clipping unit 13 of the master projector generates the display responsible area menu image 103 of each of the display responsible area 32 of projector B, the display responsible area 33 of projector C, and the display responsible area 34 of projector D. Therefore, the clipping unit 13 of the master projector generates the four kinds of display responsible area menu images 103.

If the projector serves as a slave projector and is in working mode A, the clipping unit 13 generates, based on the menu specifications 101 received by the receiving unit 14, the display responsible area menu image 103 from the menu image 102 generated by the generating unit 12. In this case, the clipping unit 13 generates only the display responsible area menu image 103 of the projector.

If the projector serves as a slave projector and is in working mode B, the clipping unit 13 generates, based on the menu specifications 101 received by the receiving unit 14, the display responsible area menu image 103 from the menu image 102 received by the receiving unit 14. In this case as well, the clipping unit 13 generates only the display responsible area menu image 103 of the projector.

If the projector serves as a slave projector and is in working mode C, the clipping unit 13 performs no operation and generates no display responsible area menu image 103.

In this embodiment, the display responsible area menu image 103 is clipped from the menu image 102 by obtaining a product set of the display area of the projector and the area of the menu window 27 including the overlapping area 25. An arrangement or method of obtaining a product set of areas is a well-known technique. Therefore, it is possible to construct the clipping unit 13 using an arbitrary known technique. The operation of the clipping unit 13 is not limited to the arrangement/method of obtaining a product set.

A network configuration used in the multi-projection system will be described with reference to FIGS. 5A and 5B. A network configuration used in the multi-projection system according to the present invention may be a daisy chain configuration shown in FIG. 5A or a start configuration shown in FIG. 5B. In the daisy chain configuration, respective projectors are connected in a ring shape. In the star configuration, respective projectors are interconnected via a HUB 2. Note that the network configuration is not limited to the two network configurations shown in FIGS. 5A and 5B, and any configuration can be adopted as long as the menu information 105 (setting screen information) can be exchanged between the projectors forming the multi-projection system.

The operation of the receiving unit 14 will be described. The receiving unit 14 receives the menu information 105 transmitted by another projector. The menu information 105 includes at least data shown in Table 4 in accordance with the working mode.

TABLE 4

| | working mode of projector | menu information |
|---|---|---|
| 1 | working mode A | ID of transmission destination projector<br>menu specifications |
| 2 | working mode B | ID of transmission destination projector<br>menu specifications<br>menu image |
| 3 | working mode C | ID of transmission destination projector<br>menu specifications<br>menu image of responsible area |

The projector ID is an identifier for uniquely identifying a projector forming a given multi-projection system. This identifier does not depend on the form of the projector ID, and any form can be adopted as long as it is possible to uniquely identify a projector. For example, different natural numbers starting from 1 may be assigned to the projectors forming the multi-projection system, and a projector ID expressed by the assigned four-digit decimal natural number may be used. In this case, a projector ID "0000" indicates broadcast, and thus all the projectors are transmission destination projectors.

The receiving unit 14 compares the transmission destination projector ID of the menu information 105 with the projector ID of itself. If the transmission destination projector ID coincides with the projector ID of itself, the receiving unit 14 transmits the received menu information 104 to the generating unit 12, clipping unit 13, and selection unit 16 in accordance with the working mode. At this time, if the network configuration is the daisy chain configuration shown in FIG. 5A, the receiving unit 14 transmits the received menu information 104 to the transmitting unit 15 regardless of whether the transmission destination projector ID coincides with the projector ID of itself.

The operation of the transmitting unit 15 will be described. The transmitting unit 15 generates the menu information 105, and transmits it to another projector. If the projector serves as a master projector, the transmitting unit 15 generates the menu information 105 from the menu specifications 101, menu image 102, or display responsible area menu image 103 in accordance with the working mode, and transmits it. On the other hand, if the projector serves as a slave projector, the transmitting unit 15 generates no menu information 105. Note that only if the network configuration is the daisy chain configuration shown in FIG. 5A, the transmitting unit 15 transmits the menu information 105 received by the receiving unit 14 to the succeeding projector.

The menu information 105 generated by the transmitting unit 15 will be described by exemplifying the multi-projection system shown in FIG. 3. Assume that projector A serves as a master projector. The projector ID is expressed by the above-described four-digit decimal natural number. That is, the projector IDs of projectors A to D are assigned as follows.

| Projector A | 0001 |
|---|---|
| Projector B | 0002 |
| Projector C | 0003 |
| Projector D | 0004 |
| Broadcast | 0000 |

Table 5 shows the menu information 105 generated by the transmitting unit 15 for each working mode. In working mode A, the transmission destination projector ID is "0000", that is, broadcast, and thus the common menu information 105 is transmitted to all the slave projectors. In working mode A, since the menu information 105 includes the menu specifications 101, the menu specifications 101 generated by the master projector are transmitted to all the slave projectors. In working mode A, each of all the slave projectors generates the menu image 102 based on the menu specifications 101 generated by the master projector. The operation in working mode A is implemented by transmitting the menu specifications 101 to all the slave projectors by broadcast.

In working mode B as well, the transmission destination projector ID is "0000", that is, broadcast, and thus the common menu information 105 is transmitted to all the slave projectors. In working mode B, the menu information 105 includes the menu specifications 101 and the menu image 102. Therefore, the menu specifications 101 and the menu image 102 which have been generated by the master projector are transmitted to all the slave projectors. In working mode B, each slave projector clips the display responsible area menu image 103 from the menu image 102 generated by the master projector. The operation in working mode B is implemented by transmitting the menu specifications 101 and the menu image 102 to all the slave projectors by broadcast.

In working mode C, the master projector generates the display responsible area menu image 103 of each slave projector, and transmits it to the corresponding slave projector. Therefore, the transmitting unit 15 generates and transmits the menu information 105 for each slave projector. In this embodiment, as shown in Table 5, the transmitting unit 15 generates and transmits three kinds of menu information 105 respectively corresponding to projectors B, C, and D. For example, the menu information 105 transmitted to projector B includes the following information.

ID of transmission destination projector: 0002 menu image of display responsible area: display responsible area menu image of projector B

TABLE 5

| working mode of projector | | menu information |
|---|---|---|
| 1 working mode A | | ID of transmission destination projector: 0000 (broadcast) menu specifications |
| 2 working mode B | | ID of transmission destination projector: 0000 (broadcast) menu image |
| working mode C | transmission destination: projector B | ID of transmission destination projector: 0002 menu specifications menu image of responsible area displayed by projector B |
| | transmission destination: projector C | ID of transmission destination projector: 0003 menu specifications menu image of responsible area displayed by projector C |
| | transmission destination: projector D | ID of transmission destination projector: 0004 menu specifications menu image of responsible area displayed by projector D |

The operation of the selection unit 16 will be described. The selection unit 16 selects the display responsible area menu image generated by the clipping unit 13 and the display responsible area menu image received by the receiving unit 14 in accordance with the working mode, generates the display image 106, and instructs to display the display image 106. For example, if the working mode of the projector is working mode A or B, the display responsible area menu image 103 generated by the clipping unit 13 is selected. On the other hand, if the working mode of the projector is working mode C, the display responsible area menu image received by the receiving unit 14 is selected.

The operation of the master projector and that of each slave projector will be described next.

Figure 6:
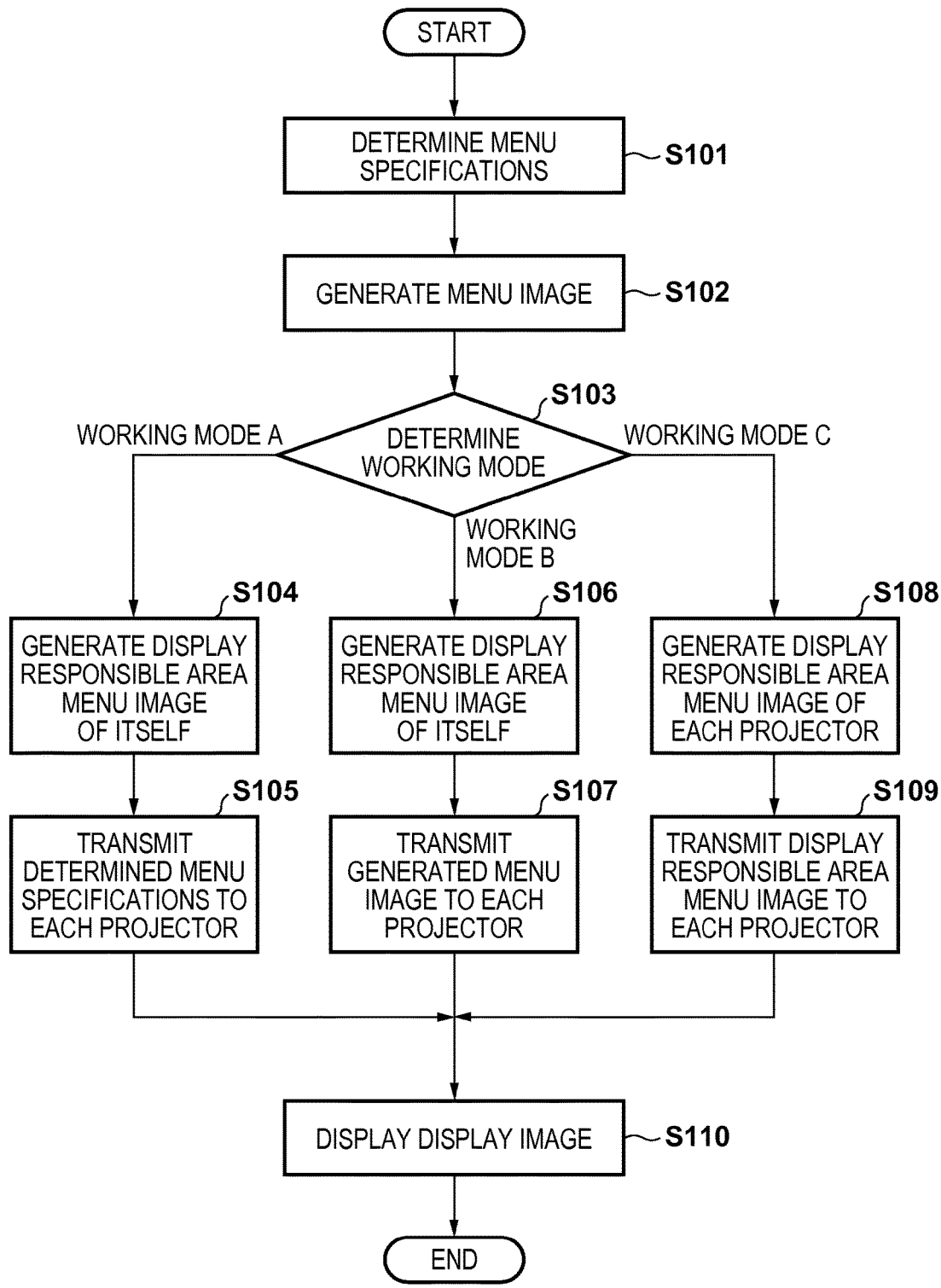
FIG. 6 is a flowchart illustrating the operation of a master projector.

FIG. 6 is a flowchart illustrating the operation of the master projector. Note that processing shown in FIG. 6 is implemented when the CPU 1101 reads out the program stored in the ROM 1103, and executes it on the RAM 1102. Assume that the working mode of the master projector is designated via the input device 1109, and the designated working mode is stored in the RAM 1102 as working mode information.

In step S101, the CPU 1101 causes the determination unit 11 to determine the menu specifications 101. In step S102, the CPU 1101 causes the generating unit 12 to generate the menu image 102 based on the determined menu specifications 101. In step S103, the CPU 1101 causes the clipping unit 13 to determine the working mode with reference to the working mode information stored in the RAM 1102.

If it is determined that the working mode is working mode A, the CPU 1101 causes, in step S104, the clipping unit 13 to clip the display responsible area of the master projector itself from the menu image 102, and generate the display responsible area menu image 103. In step S105, the CPU 1101 causes the transmitting unit 15 to transmit the menu specifications 101 determined by the determination unit 11 to each slave projector as the menu information 105. Note that steps S104 and S105 can be processed in parallel or the processing order of steps S105 and S104 may be reversed.

If it is determined that the working mode is working mode B, the CPU 1101 causes, in step S106, the clipping unit 13 to clip the display responsible area of the master projector itself from the menu image 102, and generate the display responsible area menu image 103. In step S107, the CPU 1101 causes the transmitting unit 15 to transmit the menu image 102 generated by the generating unit 12 together with the menu specifications 101 determined by the determination unit 11 to each slave projector as the menu information 105. Note that steps S106 and S107 can be processed in parallel or the processing order of steps S106 and S107 may be reversed.

If it is determined that the working mode is working mode C, the CPU 1101 causes, in step S108, the clipping unit 13 to clip the display responsible area of each of the master projector itself and the slave projectors from the menu image 102, and generate the display responsible area menu image 103 of each projector. In step S109, the CPU 1101 causes the transmitting unit 15 to transmit the display responsible area menu image 103 of each slave projector clipped by the clipping unit 13 together with the menu specifications 101 determined by the determination unit 11 to the corresponding slave projector as the menu information 105. Note that steps S108 and S109 can be processed in parallel or the processing order of steps S108 and S109 may be reversed.

In step S110, upon completion of transmission by the transmitting unit 15 in accordance with the working mode, the CPU 1101 causes the selection unit 16 to select the display responsible area menu image 103 as the display image 106, and display it.

FIG. 7 is a flowchart illustrating the operation of each slave projector. Note that processing shown in FIG. 7 is implemented when the CPU 1101 reads out the program stored in the ROM 1103, and executes it on the RAM 1102.

In step S201, the CPU 1101 causes the receiving unit 14 to receive the menu information 105 from the master projector. In step S202, the CPU 1101 causes the generating unit 12 to determine the working mode of itself based on the information included in the menu information 105.

If it is determined that the working mode is working mode A, the CPU 1101 causes, in step S203, the clipping unit 13 to clip, based on the menu specifications 101 included in the menu information 105, the display responsible area of itself from the menu image 102 generated by the generating unit 12, and generate the display responsible area menu image 103. After that, in step S205, the CPU 1101 causes the selection unit 16 to select the display responsible area menu image 103 as the display image 106, and display it.

If it is determined that the working mode is working mode B, the CPU 1101 causes, in step S204, the clipping unit 13 to clip the display responsible area of itself from the menu image 102 included in the menu information 105, and generate the display responsible area menu image 103. After that, in step S205, the CPU 1101 causes the selection unit 16 to select the display responsible area menu image 103 as the display image 106, and display it.

If it is determined that the working mode is working mode C, the CPU 1101 causes, in step S205, the selection unit 16 to select the display responsible area menu image 103 included in the menu information 105 as the display image 106, and display it.

As described above, according to this embodiment, it is possible to enlarge the area for displaying the menu window serving as an interface for performing a setting operation by displaying the menu window in the entire display area including the overlapping area of the display areas of the plurality of projectors, thereby implementing a setting operation.

It is also possible to display the menu window on the overlapping area applied with edge blending. Therefore, the present invention can improve the efficiency of the setting operation in the multi-projection system, and increase the commercial value of the projector, thereby enhancing the customer appeal in the market.

In the above-described embodiment, an example in which the user sets the display position and size of the menu window and an example in which the display position and size of the menu window are determined based on the position of the operator (user) have been explained. The present invention, however, is not limited to them. For example, it is also possible to set the display position and size of the menu window so as to display the menu window (setting screen) in a predetermined area (for example, the central portion) on the multi-projection area in the multi-projection system. In this case, it is possible to automatically display the menu window in the central portion not only when multi-projection is performed using four projectors but also when multi-projection is performed using 3×3=9 projectors or 2×3=6 projectors. Note that if multi-projection is performed by 3×3 projectors and it has been set to display the menu window in the central portion on the multi-projection area, the menu window may not be displayed across the display areas of the plurality of projectors.

Second Embodiment

FIG. 8 is a block diagram showing the arrangement of a display control apparatus according to the second embodiment. In the second embodiment, a notification unit 17 is added to the arrangement according to the first embodiment. The notification unit 17 detects a projector whose display position adjustment is incomplete, and notifies a determination unit 11 of it. For example, the notification unit 17 causes an imaging unit 1107 to capture a large display area 26 of a multi-projection system based on menu specifications 101, detects the display position of the display area of each projector from the captured video, and detects, based on the detection result, a projector whose display position adjustment is incomplete. Alternatively, the user may directly set a projector whose display position adjustment is incomplete by using the notification unit 17. An example of the notification unit 17 is not limited to the above two examples, as a matter of course. The present invention does not depend on the example of the notification unit 17, and thus the notification unit 17 can be implemented using a known technique.

Note that the imaging unit 1107 for capturing the large display area 26 of the multi-projection system may be mounted on at least one of a plurality of projectors forming the multi-projection system. In this case, the projector incorporating the imaging unit 1107 detects a projector whose display position adjustment is incomplete. Alternatively, the imaging unit 1107 may be a separate unit, and may be communicably connected to each of the plurality of projectors forming the multi-projection system. In this case, in accordance with an instruction of the imaging unit 1107 or a predetermined projector (for example, a master projector), a projector whose display position adjustment is incomplete is detected.

An example applied to the multi-projection system in which display position adjustment is not completed (display position is incomplete) will be explained.

Figure 9A:
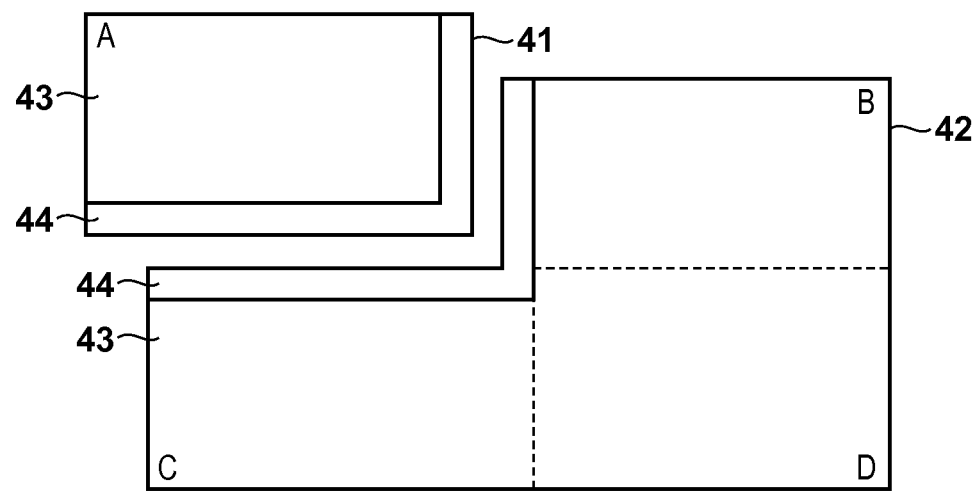
FIGS. 9A and 9B are views showing an example when an unadjusted projector exists.
Figure 9B:
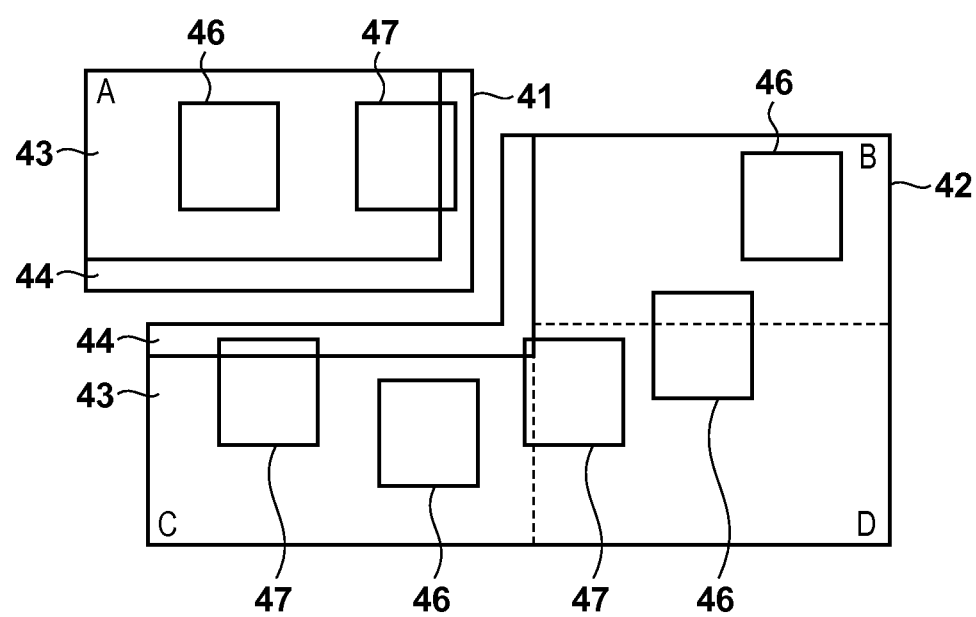

FIGS. 9A and 9B show an example when display position adjustment of at least one of the plurality of projectors forming the multi-projection system is not completed. Assume that projector A serves as a master projector. Referring to FIG. 9A, since display position adjustment of a master projector, that is, projector A is incomplete, a state in which construction of the multi-projection system is not completed is indicated. As shown in FIG. 9A, a display area 41 of the master projector, that is, the display area of projector A is formed from a non-overlapping area 43 and an overlapping area 44 associated with an unadjusted display area. An adjusted display area 42 is also formed from a non-overlapping area 43 and an overlapping area 44 associated with an unadjusted display area. The adjusted display area 42 and the overlapping area 44 associated with the unadjusted display area are determined based on information of the projector whose display position adjustment is incomplete and which has been detected by the notification unit 17.

In the state shown in FIG. 9A, a menu window is displayed under the following condition.

<a>: The menu window is displayed only when the entire area of the menu window exists in the non-overlapping area 43 (in the display area 41 or the adjusted display area 42). That is, the menu window is not displayed (display of the menu window is prohibited) in an area overlapping the overlapping area 44 associated with the unadjusted display area.

FIG. 9B shows an example in which the menu window is displayed under the condition <a>. Referring to FIG. 9B, each display enable menu window 46 is a menu window arranged at a display enable position on the adjusted display area 42 or the non-overlapping area 43 of the display area 41. On the other hand, each display disable menu window 47 indicates a menu arranged at a display disable position on the overlapping area 44. The display disable menu window 47 is used to explain a display disable position, and the display disable menu window 47 is never displayed in fact.

As described above, if the user attempts to display the menu window at a display disable position, that is, in an area overlapping the overlapping area 44 associated with the unadjusted display area (that is, when the receiving unit 14 accepts a display instruction as an acceptance unit), the notification unit 17 displays an error message (warning display) indicating that the menu window cannot be displayed, thereby warning the user.

Since display position adjustment of the slave projector is incomplete, an example of the multi-projection system which has not been completely constructed will be explained.

Figure 10A:
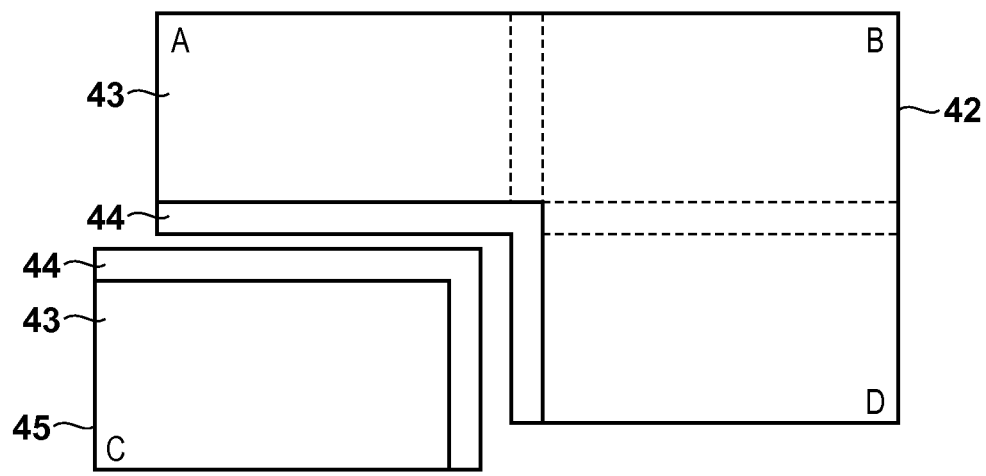
FIGS. 10A and 10B are views showing another example when an unadjusted projector exists.

FIG. 10A shows a state in which construction of the multi-projection system is not completed since display position adjustment of projector C serving as a slave projector is incomplete. In FIG. 10A as well, assume that projector A serves as a master projector. As shown in FIG. 10A, a display area 45 of the slave projector whose display position adjustment is incomplete, that is, the display area of projector C is formed from the non-overlapping area 43 and the overlapping area 44 associated with the unadjusted display area. The adjusted display area 42 is also formed from the non-overlapping area 43 and the overlapping area 44 associated with the unadjusted display area. In this case, the adjusted display area 42 and the overlapping area 44 associated with the unadjusted display area are determined based on information of the projector whose display position adjustment is incomplete and which has been detected by the notification unit 17.

In the state shown in FIG. 10A, the menu window is displayed under the following condition.

<b> The menu window is displayed only when the entire area of the menu window exists in the non-overlapping area 43 on the adjusted display area 42.

Figure 10B:
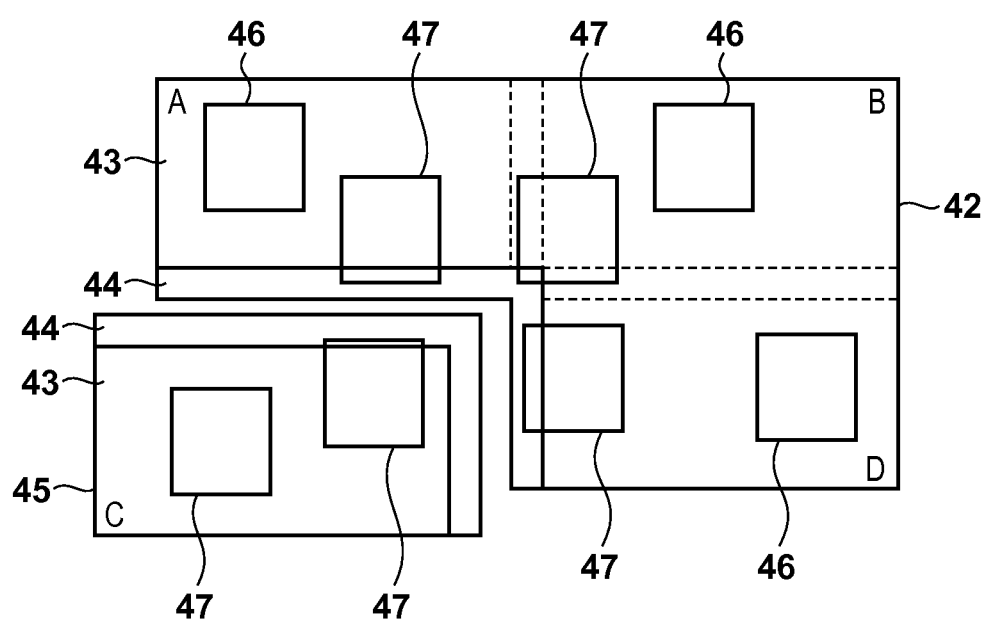

FIG. 10B shows an example in which the menu window is displayed under the condition <b>. Referring to FIG. 10B, each display enable menu window 46 is a menu window arranged at a display enable position on the adjusted display area 42. On the other hand, each display disable menu window 47 indicates a menu window arranged at a display disable position on the display area 45 or the non-overlapping area 43. The display disable menu window 47 is used to explain a display disable position, and the display disable menu window 47 is never displayed in fact. That is, unlike the master projector, in the slave projector, if the display position of the display area 45 of itself has not been adjusted, the menu window cannot be displayed at a position even in the display area 45.

In this way, if the user attempts to display the menu window at a display disable position, that is, in the area overlapping the overlapping area 44 associated with the unadjusted display area, the notification unit 17 displays an error message indicating that the menu window cannot be displayed, thereby warning the user.

Figure 11:
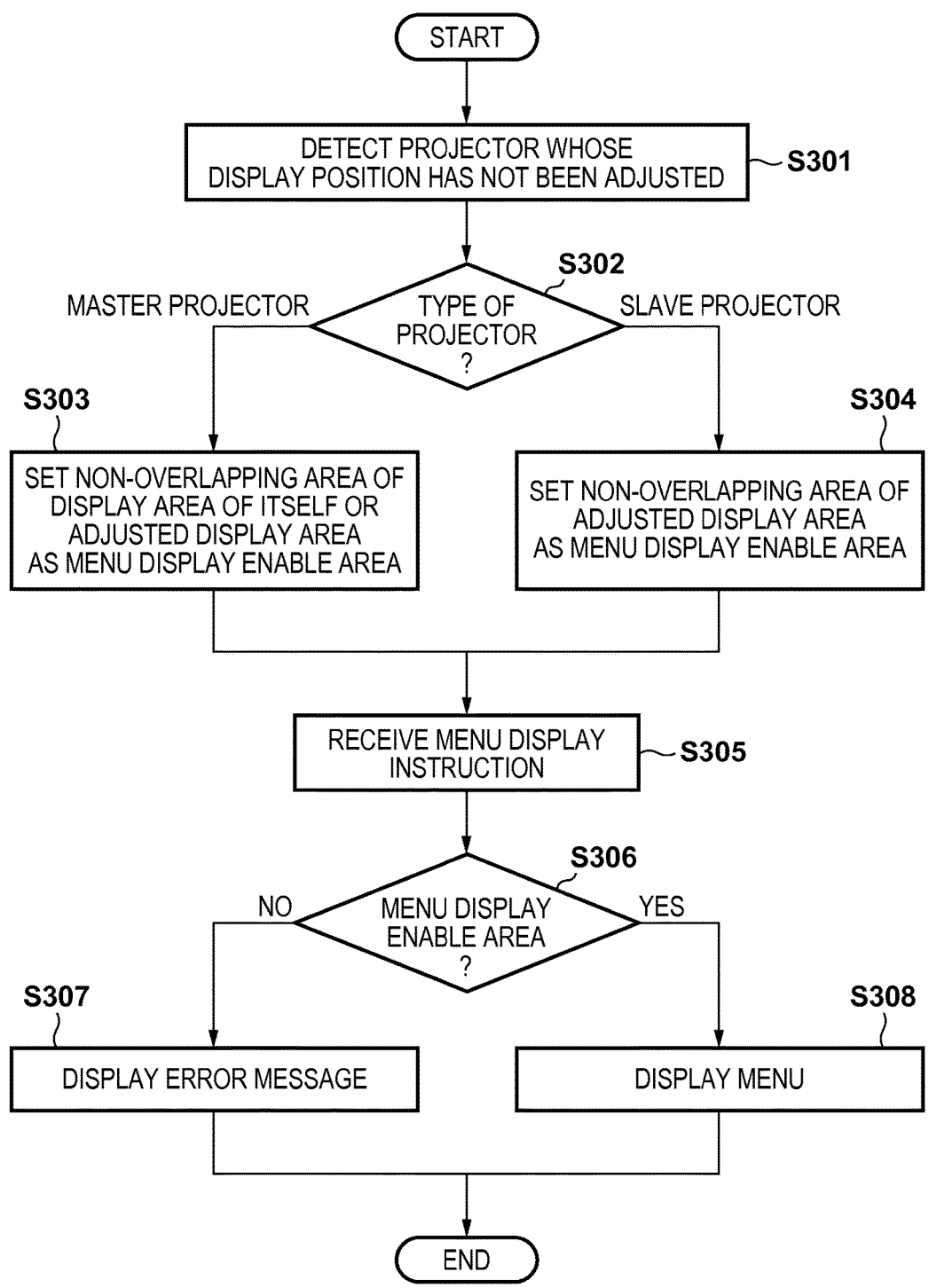
FIG. 11 is a flowchart illustrating menu display control processing.

Menu display control of the projector according to the second embodiment will be described with reference to FIG. 11. Note that processing shown in FIG. 11 is implemented when a CPU 1101 reads out a program stored in a ROM 1103, and executes it on a RAM 1102.

In step S301, the CPU 1101 causes the notification unit 17 to detect a projector whose display position has not been adjusted. In step S302, the CPU 1101 determines the type of the detected projector. If the type of the projector is a master projector, the CPU 1101 causes, in step S303, a selection unit 16 to set a non-overlapping area of the display area of itself or the adjusted display area as a menu display enable area in which display of the menu window is permitted. On the other hand, if the type of the projector is a slave projector, the CPU 1101 causes, in step S304, the selection unit 16 to set the non-overlapping area of the adjusted display area as a menu display enable area in which display of the menu window is permitted.

In step S305, the CPU 1101 receives a menu window display instruction. In step S306, it is determined whether the entire area of the menu window at a display position designated by the display instruction exists within the menu display enable area. If not the entire area of the menu window exists within the menu display enable area (NO in step S306), the CPU 1101 causes the selection unit 16 to display an error message indicating that the menu window cannot be displayed. On the other hand, if the entire area of the menu window exists within the menu display enable area (YES in step S306), the CPU 1101 causes the selection unit 16 to display the menu window at the designated display position.

As described above, according to the second embodiment, it is possible to detect the display position of the display area of the projector, and notify the user of whether the menu window can be displayed, in addition to the effects described in the first embodiment.

Third Embodiment

The first and second embodiments assume an arrangement in which a projector itself incorporates the display control apparatus shown in FIGS. 1A and 1B or FIG. 6. However, the display control apparatus may exist as a separate apparatus communicably connected to a projector. Especially when the display control apparatus exists as a separate apparatus, the display control apparatus may clip and generate, from a setting screen, a partial image (at least part of a setting screen) of a menu window serving as a setting screen corresponding to an area, display of which each projector is in charge of, and transmit the partial image to each projector. At this time, under control complying with the working mode described in the first embodiment, at least menu specifications, a menu image, or a display responsible area menu image may be transmitted to a projector which should be a transmission destination.

According to the arrangement in each of the above-described embodiments, it is possible to efficiently set a projector.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-231973, filed Nov. 14, 2014, which is hereby incorporated by reference herein in its entirety.

What is claimed is:

1. A display control apparatus for displaying a setting window for a plurality of projectors on a multi-projection area that is formed by combining display areas of the plurality of projectors and is larger than each of the display areas, comprising:
one or more processors; and
at least one memory coupled to the one or more processors, the at least one memory having instructions stored thereon which, when executed by the one or more processors, cause the display control apparatus to:

accept a display instruction to display the setting window of at least one of the plurality of projectors, and in a case where a predetermined area on the multi-projection area in which the setting window of the projector is displayed crosses display areas of a plurality of second projectors of the plurality of projectors, cause each of the plurality of second projectors to display a partial image of the setting window in response to acceptance of the display instruction.

2. The display control apparatus according to claim 1, wherein the at least one memory has instructions stored thereon which, when executed by the one or more processors further cause the display control apparatus to:

generate the setting window of the projector, clip an area to be displayed by each of the plurality of second projectors from the generated setting window, and transmit the clipped areas of the setting window to the plurality of second projectors, respectively.

3. The display control apparatus according to claim 1, wherein the at least one memory has instructions stored thereon which, when executed by the one or more processors further cause the display control apparatus to transmit parameter information including a display position of the setting window to the plurality of second projectors so that at least part of the setting window of the projector is generated by each of the plurality of second projectors.

4. The display control apparatus according to claim 1, wherein the at least one memory has instructions stored thereon which, when executed by the one or more processors further cause the display control apparatus to:

designate a working mode for displaying the setting window, and generate the setting window of the projector, wherein if a first working mode is designated, parameter information including a display position of the setting window is transmitted to each of the plurality of second projectors so that each of the plurality of second projectors generates at least part of the setting window, and if a second working mode is designated, the at least part of the generated setting window is transmitted to each of the plurality of second projectors.

5. The display control apparatus according to claim 1, wherein the at least one memory has instructions stored thereon which, when executed by the one or more processors further cause the display control apparatus to:

detect a projector whose display position adjustment is incomplete among the plurality of projectors forming the multi-projection area, wherein the predetermined area in which the setting window of the projector is displayed is determined not to include the display area of the detected projector.

6. The display control apparatus according to claim 5, wherein the at least one memory has instructions stored thereon which, when executed by the one or more processors further cause the display control apparatus to:

designate a display position of the setting window of the projector, and send a notification of an error in a case where a display area based on the designation is included in the display area of the detected projector.

7. The display control apparatus according to claim 1, wherein the at least one memory has instructions stored thereon which, when executed by the one or more processors further cause the display control apparatus to:

acquire human body detection information from a motion sensor, wherein the predetermined area in which the setting window of the projector is displayed is determined based on the acquired human body detection information.

8. The display control apparatus according to claim 1, wherein the display control apparatus is mounted on one of the plurality of projectors.

9. A display control method of displaying a setting window for a plurality of projectors on a multi-projection area that is formed by combining display areas of the plurality of projectors and is larger than each of the display areas, comprising:

accepting a display instruction to display the setting window of at least one of the plurality of projectors; and causing, in a case where a predetermined area on the multi-projection area in which the setting window of the projector is displayed crosses display areas of a plurality of second projectors of the plurality of projectors, each of the plurality of second projectors to display a partial image of the setting window in response to acceptance of the display instruction.

10. The method according to claim 9, further comprising:

generating the setting window of the projector; and clipping an area to be displayed by each of the plurality of second projectors from the generated setting window, wherein in the causing step, the clipped areas of the setting window are transmitted to the plurality of second projectors, respectively.

11. The method according to claim 9, wherein in causing step, parameter information including a display position of the setting window is transmitted to the plurality of second projectors so that at least part of the setting window of the projector is generated by each of the plurality of second projectors.

12. A non-transitory computer readable storage medium storing a program for causing a computer, which is incorporated in a display control apparatus for displaying a setting window for a plurality of projectors on a multi-projection area that is formed by combining display areas of the plurality of projectors and is larger than each of the display areas, to execute:

accepting a display instruction to display the setting window of at least one of the plurality of projectors; and causing, in a case where a predetermined area on the multi-projection area in which the setting window of the projector is displayed crosses display areas of a plurality of second projectors of the plurality of projectors, each of the plurality of second projectors to display a partial image of the setting window in response to acceptance of the display instruction.

* * * * *